Figure 2:
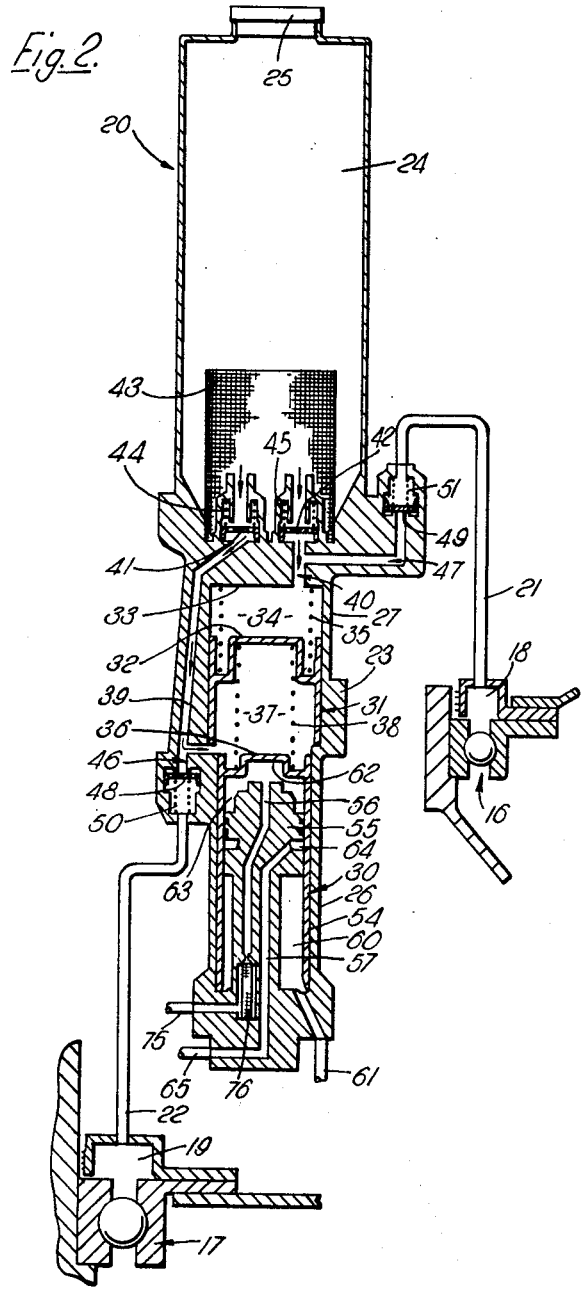

Nov. 3, 1964   J. M. S. KEEN ETAL   3,154,919
OIL DISCHARGE PUMP FOR A GAS TURBINE ENGINE
Filed Feb. 7, 1963
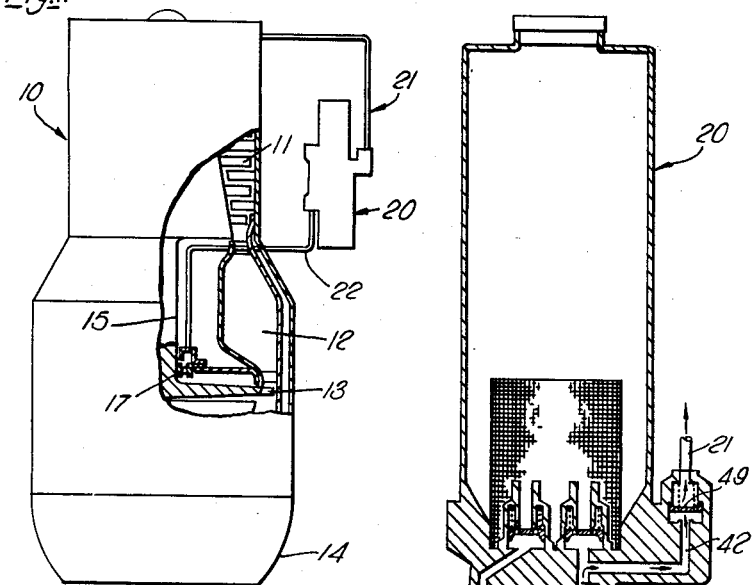
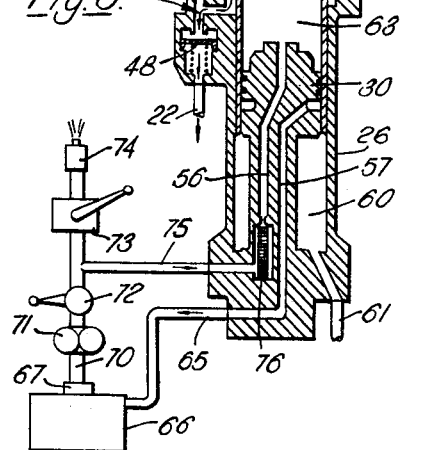

United States Patent Office 3,154,919
Patented Nov. 3, 1964

3,154,919
OIL DISCHARGE PUMP FOR A GAS
TURBINE ENGINE
John Michael Storer Keen, Allestree, James Reginald
Simpson, Littleover, and Geoffrey Alan Kenneth Pope,
Etwall, England, assignors to Rolls-Royce Limited,
Derby, England, a company of Great Britain
Filed Feb. 7, 1963, Ser. No. 256,874
4 Claims. (Cl. 60—39.08)

This invention concerns a oil discharge pump for a gas turbine engine.

According to the present invention, there is provided an oil discharge pump for a gas turbine engine comprising a piston mounted within a cylinder, means urging the piston towards a predetermined position in which there is a space in the cylinder to one side of the piston, an oil inlet duct and an oil outlet duct both of which communicate with said space, an oil inlet valve which controls flow through the oil inlet duct and which is urged towards the open position, an oil outlet valve which controls flow through the oil outlet duct and which is urged towards the closed position, and means for moving the piston to decrease the size of said space, such movement of the piston increasing the pressure of the oil in the oil inlet and oil outlet ducts so as to close the oil inlet valve, open the oil outlet valve, and force a shot of oil out through the oil outlet duct.

Preferably the oil inlet valve is constituted by a non-return valve which is urged by a spring towards the open position and the oil outlet valve is constituted by a non-return valve which is urged by a spring towards the closed position.

The oil inlet duct and the oil outlet duct may, in part, be constituted by the same duct.

The means for urging the piston towards the said predetermined position preferably comprises at least one spring.

The means for moving the piston to decrease the size of said space preferably comprises means for admitting pressure fluid to the other side of the piston. Thus there may be provided a fuel pump whose high pressure side communicates with the said other side of the piston. The aforementioned fuel pump may be employed on the gas turbine engine to pump fuel through a fuel control unit to combustion equipment of the engine.

The oil discharge pump may be provided with an oil reservoir which communicates with the oil inlet duct.

The oil discharge pump may also have a second piston which is mounted within the said space in the cylinder and is urged towards a location in which it is spaced both from the first-mentioned piston and from the adjacent end of the cylinder, there being provided a second oil inlet duct and a second oil outlet duct both of which communicate with the space between the second piston and the said end of the cylinder, a second oil inlet valve which controls flow through the second oil inlet duct and which is urged towards the open position, and a second oil outlet valve which controls flow through the second oil outlet duct and which is urged towards the closed position, movement of the first-mentioned piston towards the said end of the cylinder causing like movement of the second piston so as to close the second oil inlet valve, open the second oil outlet valve, and force a shot of oil out through the second oil outlet duct.

Preferably there is a spring acting between the second piston and the said end of the cylinder and another spring acting between the second piston and the first-mentioned piston.

The first mentioned piston may be adapted to be loosely telescoped into the second piston when the former is urged towards the said end of the cylinder.

The invention also comprises a gas turbine engine provided with an oil discharge pump as set forth above, the oil outlet duct or ducts serving to convey oil to a bearing or bearings of the engine.

The invention is illustrated, merely by way of example in the accompanying drawings, in which:

FIGURE 1 is a view, partly in section, of a gas turbine vertical lift engine provided with an oil discharge according to the present invention, and FIGURES 2 and 3 are sections through the oil discharge pump, the said sections showing the parts of the oil discharge pump in different relative positions.

FIGURES 2 and 3 respectively show some details which, for convenience, have been omitted from the other figure.

In FIGURE 1 there is shown a gas turbine vertical lift engine 10, i.e. a gas turbine engine which is adapted to produce vertical lift forces on an aircraft independently of those generated aerodynamically by forward flight of the aircraft.

The engine 10 comprises in flow series a compressor 11, combustion equipment 12, and a turbine 13, the turbine exhaust gases being directed vertically downwardly through an exhaust duct 14.

The compressor 11 and turbine 13 are mounted on a shaft 15 which is journalled in a front bearing 16 (which is not shown in FIG. 1 but is shown diagrammatically in FIG. 2) and a rear bearing 17.

The bearings 16, 17 are respectively provided with chambers 18, 19 which are adapted to be supplied with oil from an oil discharge pump 20 by way of pipes 21, 22 respectively.

The oil discharge pump 20 comprises a body 23 whose upper part is formed to provide an oil reservoir 24 which may be filled with oil after removal of a filler cap 25.

The lower part of the body 23 is formed with a common cylinder 26–27 which has its upper portion 27 which is of larger diameter than its lower portion 26.

Mounted respectively within the lower and upper portions, 26–27 of the cylinder are a first piston 30 and a second piston 31.

The second piston 31 has a side 32 which is spaced from the upper end 33 of the common cylinder's upper portion 27 by a space 34 and is urged downwardly away from the upper end 33 by a spring 35.

The first piston 30 has a side 36 which is spaced from the second piston 31 by a space 37 and is urged downwardly away from the second piston 31 by a spring 38.

The body 23 is formed with a first oil inlet duct 39, which communicates with the space 37, and a second oil inlet duct 40 which communicates with the space 34.

The oil inlet ducts 39, 40 are adapted to be supplied with oil from the oil reservoir 24, flow through the oil inlet ducts 39, 40 being controlled by non-return valves 41, 42 respectively. The non-return valves 41, 42, which are disposed within a filter 43 in the oil reservoir 24, are urged towards their open positions by springs 44, 45 respectively.

The body 23 is also formed with a first oil outlet duct 46, which communicates with the space 37 via a portion of the oil inlet duct 39, and a second oil outlet duct 47 which communicates with the space 34 via a portion of the oil inlet duct 40.

The oil outlet ducts 46, 47 are respectively adapted to supply oil to the pipes 22, 21. Flow through the oil outlet ducts 46, 47 is controlled by non-return valves 48, 49 respectively, the non-return valves 48, 49 being urged towards their closed positions by springs 50, 51 respectively.

The piston 30 has a skirt portion 54 which slidably engages both the inner wall of the common cylinder's lower portion 26 and a fixed piston member 55 which forms part of the body 23.

The fixed piston member 55, which is provided with passages 56, 57 therein, defines with the lower end of the cylinder portion 26 a space 60 which communicates with a drain passage 61.

Between the fixed piston member 55 and the adjacent side 62 of the piston 30 there is a space 63 which communicates with the passage 56. The passage 57 leads to an annular groove 64 which is formed in the curved wall of the fixed piston member 55.

The passage 57 leads, via a pipe 65, to a fuel tank 66 (FIG. 3). The fuel tank 66, which is provided with a backing pump 67, is adapted to supply fuel to a conduit 70 which incorporates in flow series a fuel pump 71, a shut-off cock 72, and a fuel flow control unit 73, the conduit 70 leading to burners 74 of the combustion equipment 12.

A pipe 75 communicates with the conduit 70 downstream of the shut-off cock 72 and hence on the high pressure side of the fuel pump 71, the pipe 75 leading via a filter 76 to the passage 56.

FIGURE 2 shows the position of the parts of the oil discharge pump 20 when the vertical lift engine 10 is not in operation. At this time, the fuel pump 71 will also not be in operation and there will therefore be no supply of high pressure fuel to the space 63. The springs 35, 38 will therefore bring the pistons 31, 30 into the positions shown in FIGURE 2 in which the areas of the spaces 34, 37 are at their maximum.

In the FIGURE 2 position, the springs 44, 45, in conjunction with the head of oil within the oil reservoir 24, will maintain the non-return valves 41, 42 open whereby oil will flow through the oil inlet ducts 39, 40 to fill the spaces 37, 34. The springs 50, 51 will however at this time maintain the non-return valves 48, 49 closed whereby to prevent the passage of oil to the bearings 16, 17.

Once, however, the vertical lift engine 10 is brought into operation, the fuel pump 71 will also be brought into operation, whereby high pressure fuel in the space 63 will act on the side 62 of the piston 30. This will cause the piston 30 to be forced upwardly and to become loosely telescoped into the piston 31. The piston 31 will at the same time be forced by the piston 30 against the upper end 33 of the common cylinder's upper portion 27.

The space 37 will therefore be reduced in size and the pressure of the oil in the ducts 39, 46 will rise so as to cause closure of the non-return valve 41 and opening of the non-return valve 48, whereby a single shot of oil will pass through the pipe 22 to the chamber 19 of the rear bearing 17.

Similarly, the space 34 will be reduced in size and the pressure of the oil in the ducts 40, 47 will rise so as to cause closure of the non-return valve 42 and opening of the non-return valve 49, whereby a single shot of oil will pass through the pipe 21 to the chamber 18 of the front bearing 16.

The parts of the oil discharge pump will remain in the FIG. 3 position throughout the operation of the vertical lift engine 10 so that only a single shot of oil can, throughout the said operation, be passed to each of the chambers 18, 19. The vertical lift engine 10 is not, however, intended to be operated for long periods and the bearings 16, 17 are arranged to receive a metered flow of oil from their chambers 18, 19.

We claim:

1. An oil discharge pump for a gas turbine engine comprising a pump body having a common cylinder therein, a first and a second piston mounted within said common cylinder, means urging the first piston towards a predetermined position in which there is a first space in the common cylinder to one side of the first piston, means urging said second piston towards a location in which it is spaced both from said first piston and from the adjacent end of the common cylinder, a second space being defined between said second piston and said adjacent end of the common cylinder, a first oil inlet duct and a first oil outlet duct both of which communicate with said first space, first oil inlet valve which controls flow through the first oil inlet duct and which is urged towards the open position, a first oil outlet valve which controls flow through the first oil outlet duct and which is urged towards the closed position, a second oil inlet duct and a second oil outlet duct both of which communicate with said second space, a second oil inlet valve which controls flow through the second oil inlet duct and which is urged towards the open position, and a second oil outlet valve which controls flow through the second oil outlet duct and which is urged towards the closed position, and means for moving the first piston to decrease the size of said first space, such movement of the first piston increasing the pressure of the oil in the first oil inlet and first oil outlet ducts so as to close the first oil inlet valve, open the first oil outlet valve, and force a shot of oil out through the first oil outlet duct, movement of the first piston also causing movement of the second piston, and thus decreasing the size of said second space so as to close the second oil inlet valve, open the second oil outlet valve, and force a shot of oil out through the second oil outlet duct.

2. An oil discharge pump for a gas turbine engine comprising a cylinder, a first and a second piston mounted within said cylinder, a first spring disposed between first and second pistons and urging said first piston towards a predetermined position in which there is a first space in the cylinder to one side of the first piston, a second spring disposed between second second piston and an adjacent end of the cylinder, and urging said second piston towards a location in which it is spaced both from the first piston and from said adjacent end of the cylinder, a second space being defined between said second piston and said end of the cylinder, a first oil inlet duct and a first oil outlet duct both of which communicate with said first space, a first oil inlet valve which controls flow through the first oil inlet duct and which is urged towards the open position, a first oil outlet valve which controls flow through the first oil outlet duct and which is urged towards the closed position, a second oil inlet duct and a second oil outlet duct both of which communicate with said second space, a second oil inlet valve which controls flow through the second oil inlet duct and which is urged towards the open position, and a second oil outlet valve which controls flow through the second oil outlet duct and which is urged towards the closed position, and means for moving the first piston to decrease the size of said first space, such movement of the first piston increasing the pressure of the oil in the first oil inlet and first oil outlet ducts so as to close the first oil inlet valve, open the first oil outlet valve, and force a shot of oil out through the first oil outlet duct, movement of the first piston also causing movement of the second piston, and thus decreasing the size of said second space so as to close the second oil inlet valve, open the second oil outlet valve, and force a shot of oil out through the second oil outlet duct.

3. An oil discharge pump for a gas turbine engine comprising a common cylinder, a first and a second piston mounted within said common cylinder, the external diameter of said first piston being smaller than the internal diameter of said second piston, whereby said first piston can slide within said second piston, means urging the first piston towards a predetermined position in which there is a first space in the common cylinder to one side of the first piston, means urging said second piston towards a location in which it is spaced both from said first piston and from the adjacent end of the common cylinder, a second space being defined between said second piston and said end of the common cylinder, a first oil inlet duct and a first oil outlet duct both of which communicate with said first space, first oil inlet valve which controls flow through the first oil inlet duct and which is urged towards the open position, a first oil outlet valve which controls flow through the first oil outlet duct and which is urged towards the closed position, a second oil inlet duct and a second oil outlet duct both of which communicate with said second space, a second oil inlet valve which controls flow through the second oil inlet duct and which is urged towards the open position, and a second oil outlet valve which controls flow through the second oil outlet duct and which is urged towards the closed position, and means for moving the first piston to decrease the size of said first space, such movement of the first piston increasing the pressure of the oil in the first oil inlet and first oil outlet ducts so as to close the first oil inlet valve, open the first oil outlet valve, and force a shot of oil out through the first oil outlet duct, movement of the first piston also causing it to slide within and cause movement of the second piston, and thus decreasing the size of said second space so as to close the second oil inlet valve, open the second oil outlet valve, and force a shot of oil out through the second oil outlet duct.

4. In a gas turbine engine comprising rotatable members, shafting on which said rotatable members are mounted, a first and a second bearing in which said shafting is journalled, combustion equipment, a source of fuel, and a fuel pump; an oil discharge pump, said oil discharge pump comprising a cylinder, a first and a second piston mounted within said cylinder, a first spring disposed between first and second pistons and urging said first piston towards a predetermined position, in which there is a first space in the cylinder to one side of the first piston, a second spring disposed between said second piston and an adjacent end of the cylinder, and urging said second piston towards a location in which it is spaced both from the first piston and from said adjacent end of the cylinder, a second space being defined between said second piston and said end of the cylinder, a first oil inlet duct and a first oil outlet duct both of which communicate with said first space, first oil inlet valve which controls flow through the first oil inlet duct and which is urged towards the open position, a first oil outlet valve which controls flow through the first oil outlet duct and which is urged towards the closed position, a second oil inlet duct and a second oil outlet duct both of which communicate with said second space, a second oil inlet valve which controls flow through the second oil inlet duct and which is urged towards the open position, and a second oil outlet valve which controls flow through the second oil outlet duct and which is urged towards the closed position, means for causing said fuel pump, which communicates with the other side of said first piston, to pump fuel under high pressure to the other side of said first piston to move said first piston and thus decrease the size of said first space, such movement of the first piston increasing the pressure of the oil in the first oil inlet and first oil outlet ducts so as to close the first oil inlet valve, open the first oil outlet valve, and force a shot of oil out through the first oil outlet duct, to said first bearing, movement of the first piston also causing movement of the second piston, and thus decreasing the size of said second space so as to close the second oil inlet valve, open the second oil outlet valve, and force a shot of oil out through the second oil outlet duct to said second bearing.

References Cited by the Examiner

UNITED STATES PATENTS

| | | | |
|---|---|---|---|
| 2,104,729 | 1/38 | Bijur | 184—29 |
| 2,884,997 | 5/59 | Bevers et al. | 60—39.14 X |
| 2,932,946 | 4/60 | Smedley et al. | 60—39.28 |
| 3,003,421 | 10/61 | Bessiere | 103—52 X |

FOREIGN PATENTS

| | | |
|---|---|---|
| 557,706 | 5/23 | France. |
| 799,484 | 8/58 | Great Britain. |

CARLTON R. CROYLE, *Primary Examiner.*

ABRAM BLUM, *Examiner.*